(12) United States Patent
Visscher

(10) Patent No.: US 9,644,314 B2
(45) Date of Patent: May 9, 2017

(54) PRIMARY CARPET BACKING

(75) Inventor: Edze Jan Visscher, Utrecht (NL)

(73) Assignee: LOW & BONAR B.V., Arnheim (NL)

( * ) Notice: Subject to any disclaimer, the term of this patent is extended or adjusted under 35 U.S.C. 154(b) by 0 days.

(21) Appl. No.: 13/514,823

(22) PCT Filed: Dec. 7, 2010

(86) PCT No.: PCT/EP2010/069042
§ 371 (c)(1),
(2), (4) Date: Jun. 8, 2012

(87) PCT Pub. No.: WO2011/069996
PCT Pub. Date: Jun. 16, 2011

(65) Prior Publication Data
US 2012/0244310 A1    Sep. 27, 2012

(30) Foreign Application Priority Data

Dec. 9, 2009 (EP) .................................... 09178463

(51) Int. Cl.
| | | |
|---|---|---|
| *D05C 17/02* | (2006.01) | |
| *B32B 5/26* | (2006.01) | |
| *D06N 7/00* | (2006.01) | |
| *B32B 5/08* | (2006.01) | |
| *B32B 27/36* | (2006.01) | |
| *B60N 3/04* | (2006.01) | |
| *D04H 3/009* | (2012.01) | |
| *D04H 3/011* | (2012.01) | |
| *D04H 3/14* | (2012.01) | |
| *D04H 3/147* | (2012.01) | |
| *D04H 11/08* | (2006.01) | |
| *D04H 13/00* | (2006.01) | |

(52) U.S. Cl.
CPC ............ *D06N 7/0068* (2013.01); *B32B 5/08* (2013.01); *B32B 5/26* (2013.01); *B32B 27/36* (2013.01); *B60N 3/048* (2013.01); *D04H 3/009* (2013.01); *D04H 3/011* (2013.01); *D04H 3/14* (2013.01); *D04H 3/147* (2013.01); *D04H 11/08* (2013.01); *D04H 13/00* (2013.01); *D05C 17/023* (2013.01); *B32B 2250/20* (2013.01); *B32B 2262/02* (2013.01); *B32B 2262/12* (2013.01); *B32B 2262/14* (2013.01); *B32B 2471/02* (2013.01); *D06N 2201/02* (2013.01); *D06N 2201/10* (2013.01); *Y10T 428/23979* (2015.04); *Y10T 442/10* (2015.04); *Y10T 442/3065* (2015.04); *Y10T 442/609* (2015.04)

(58) Field of Classification Search
CPC .... D06N 7/0068; D06N 2201/10; D04H 3/00; D04H 3/0014; D04H 3/03; D04H 3/033; D04H 3/14; D04H 3/147; D04H 3/153
USPC .......... 428/95; 442/364, 381, 382, 389, 392, 442/400, 401, 409, 415
See application file for complete search history.

(56) References Cited

U.S. PATENT DOCUMENTS

| | | |
|---|---|---|
| 3,940,302 A | 2/1976 | Matthews et al. |
| 4,041,203 A * | 8/1977 | Brock ..................... B32B 37/15 156/291 |
| 4,140,071 A | 2/1979 | Gee et al. |
| 5,382,400 A * | 1/1995 | Pike ..................... D04H 1/5405 156/290 |
| 5,660,910 A | 8/1997 | Hoyt et al. |
| 6,207,599 B1 * | 3/2001 | Coolen et al. ................ 442/242 |
| 6,274,521 B1 * | 8/2001 | Barbier et al. ................ 442/401 |
| 6,500,538 B1 * | 12/2002 | Strack .................... A41D 31/02 428/332 |
| 6,808,786 B2 | 10/2004 | Theiss |
| 6,849,565 B1 * | 2/2005 | Gardner et al. ................ 442/35 |
| 2002/0037679 A1 | 3/2002 | Bansal et al. |
| 2003/0175474 A1 | 9/2003 | Higgins et al. |
| 2004/0253888 A1 * | 12/2004 | Iedema ..................... D04H 1/44 442/59 |
| 2005/0142325 A1 * | 6/2005 | Veurink et al. ................ 428/95 |
| 2005/0147787 A1 * | 7/2005 | Bailey et al. .................. 428/95 |
| 2005/0249912 A1 * | 11/2005 | Randall et al. ................ 428/95 |
| 2006/0019056 A1 * | 1/2006 | Turner et al. .................. 428/85 |
| 2006/0051328 A1 * | 3/2006 | Johnson ..................... 424/93.7 |
| 2007/0082173 A1 * | 4/2007 | Gardner et al. ................ 428/95 |
| 2007/0172630 A1 | 7/2007 | Jones et al. |
| 2007/0269631 A9 * | 11/2007 | Pacione et al. ................ 428/95 |
| 2008/0038546 A1 * | 2/2008 | Kuik et al. ..................... 428/339 |
| 2008/0116129 A1 * | 5/2008 | Oosterbroek et al. ...... 210/500.1 |
| 2008/0241459 A1 * | 10/2008 | Higgins et al. ................ 428/95 |
| 2008/0271840 A1 * | 11/2008 | Randall et al. .......... 156/244.23 |
| 2009/0081406 A1 * | 3/2009 | Higgins et al. ................ 428/95 |
| 2009/0152191 A1 * | 6/2009 | Dijkema et al. ............. 210/505 |
| 2009/0157030 A1 * | 6/2009 | Turner et al. ................. 604/367 |
| 2009/0304953 A1 * | 12/2009 | Dijkema et al. ................ 428/17 |
| 2010/0003449 A1 * | 1/2010 | Turner et al. ................. 428/86 |
| 2010/0092721 A1 * | 4/2010 | Maltha et al. ................. 428/95 |
| 2010/0105273 A1 * | 4/2010 | Motomura et al. .......... 442/329 |

FOREIGN PATENT DOCUMENTS

| | | |
|---|---|---|
| CN | 1282782 C | 11/2006 |
| DE | 20 2008 016 836 U1 | 4/2009 |
| JP | 04316654 A * | 11/1992 |
| JP | A-04-352861 | 12/1992 |
| JP | 05177634 A * | 7/1993 |

OTHER PUBLICATIONS

"An Introduction to Bicomponent Fibers," http://www.hillsinc.net/articles/bicointro.htm, printout Jul. 8, 2014, content date 2001.*

(Continued)

Primary Examiner — Cheryl Juska
(74) Attorney, Agent, or Firm — Oliff PLC

(57) ABSTRACT

A primary carpet backing including at least a first and a second layer of fibers, characterized in that both the first and the second layer of fibers is a nonwoven layer of randomly laid fibers, that both the first layer of fibers and the second layer of fibers has a uniform composition throughout the layer, wherein the linear density of the fibers is in the range of 1 to 25 dtex, wherein both the first layer of fibers and second layer includes at least two different polymers and wherein at least one polymer included in the first layer is different from the polymers included in the second layer.

14 Claims, No Drawings

(56) References Cited

FOREIGN PATENT DOCUMENTS

| JP | 09119056 A | * | 5/1997 |
| JP | 09209254 A | * | 8/1997 |
| JP | 09291457 A | * | 11/1997 |
| JP | 10245759 A | * | 9/1998 |
| JP | 11172564 A | * | 6/1999 |
| JP | 3048400 B2 | * | 6/2000 |
| JP | 2011047098 A | * | 3/2011 |
| WO | WO 93/13254 | | 7/1993 |
| WO | WO 03/033801 A2 | | 4/2003 |
| WO | WO 2006/032433 A1 | | 3/2006 |

OTHER PUBLICATIONS

International Search Report issued in PCT/EP2010/069042; Apr. 19, 2011.
Written Opinion of International Searching Authority issued in PCT/EP2010/069042; Apr. 19, 2011.
International Preliminary Report on Patentability issued in PCT/EP2010/069042; Feb. 24, 2012.

* cited by examiner

PRIMARY CARPET BACKING

BACKGROUND

The invention pertains to primary carpet backings comprising at least two different layers of fibers.

Nonwoven primary carpet backings for tufted carpets have been known for many years. The nonwoven primary carpet backings used in carpet production are either nonwovens comprising a backbone of polyester fibers, e.g. PET, or nonwovens comprising a backbone polypropylene fibers. The term fibers as used herein refers both to staple fibers and filaments.

In general the polypropylene or polyester fibers are filaments in the range of 1 to 25 dtex, preferably in the range of 2 to 20 dtex, most preferably in the range of 5 to 15 dtex providing the required processing stability. The unit dtex defines the fineness of the filaments as their weight in grams per 10000 meter.

The backbone fibers can be entangled by mechanical needling and/or hydroentanglement with fine water jets and optionally bonded with a chemical binder.

Alternatively, the backbone fibers can be thermally bonded, for example by calendaring or through air bonding or the like, using a lower melting polymer which is present in the form of fibers or which has been added as a powder or as granulate. When the lower melting polymer is present in the form of a fiber, the polymer can be present as separate monocomponent fibers or the lower melting polymer can be present together with the backbone polymer in the same fibers in so-called bicomponent or multicomponent fibers. Bicomponent fibers are well known in the art, for example as side-by-side, core/sheath or segmented pie fibers. Alternatively, fibers composed of a single polymer but with varying crystallinity along the length of the fiber can be used as bicomponent fibers as varying crystallinity results in fiber sections consisting of polymer with different melting points along the length of the fiber. Such an effect can for example be obtained by stretching the fibers to different degrees in a spin-draw process to obtain varying crystallinity and thus varying melting point along the length of the fibers as disclosed in WO 93/13254.

In case both the backbone polymer, such as for example polyester or polypropylene, and the lower melting polymer are present as separate monofilaments so-called bifilament nonwoven types are created. Alternatively, the lower melting polymer can be present in the same filament as the backbone polymer thus forming bicomponent filament nonwovens.

WO 03/033801 discloses multilayer nonwoven carpet backings wherein the composition varies in different sections in a single nonwoven layer to influence the mechanical properties of each section within this single layer in order to facilitate optimised moulding of tufted car carpets.

U.S. Pat. No. 6,808,786 discloses a two-part primary carpet backing for improved acoustic properties. The first layer is a woven or nonwoven material. The second backing layer is formed of microfilament spunlaced material to obtain sound absorbing acoustic properties. Both layers are bonded together in a separate production step with an adhesive web.

The process of making a tufted carpet comprises the steps of providing a primary carpet backing material into a tufting machine, tufting the backing material with tufting yarns to obtain a greige carpet with a face side showing the tufts and a back side where the back stitches are formed. A tuft is the visible part of the tufting yarn on the face side of a greige or carpet. A back stitch is the visible part of the tuft yarn on the backside of a greige carpet.

Over the years, nonwoven primary carpet backings have been improved constantly in order to meet the ever more stringent demands of carpet manufacturers and consumers. New tufting techniques such as high-low tufting to produce carpets with high tufts and low tufts in a single carpet require primary carpet backings with improved stitch holding capabilities to hold the tufts in place in the tufting process. Of particular importance are improving the appearance of the finished carpet, allowing effective mending of imperfections which occur during tufting, and facilitating tuftability, i.e. by providing lower tuft-needle penetration resistance and reduced needle deflection during tufting, avoiding backtags, increasing stitch holding performance and reducing noise during tufting.

The newly formed tufts in the greige carpet are held into place by the stitch holding capacity of the primary carpet backing material. Stitch holding is the force required to remove a loop from a greige carpet from the back side. It determines how strong the interaction is between the primary carpet backing and the tufting yarn. The stitch holding determines the chance of failures in the subsequent processing steps after tufting until a pre-coat has been applied to lock the tufts in place. These processing steps can comprise dyeing, pre-coating, tentering, steaming and/or transport of rolls of greige carpet. Each of these processing steps are executed under severe conditions regarding temperature and/or applied tensions, which pose high demands to the primary carpet backing material. The tuft-bind performance of the pre-coat determines mainly how well the tufts are held in place in the pre-coated carpet. After pre-coating a heavy layer can be coated onto the back side of the pre-coated carpet and/or a secondary carpet backing can be applied.

The primary carpet backing should exhibit good tuft holding characteristics. The primary carpet backing should have a high stitch holding capacity to hold the tufts in place during the dynamic process of tufting to obtain tufts of essentially the same height for an even carpet surface in the greige carpet. The stitch holding capacity of a primary carpet backing is the ability to put the tufts in place during the tufting process where the tufts are formed and to hold the tufts in place, directly after being formed, during the formation of the following tufts. It determines the face and backtags of the greige carpet during the tufting process. A backtag is a loose or uneven backstitch in a greige carpet, in essence a tuft which was formerly on the carpet face that is now (partially) on the back side. During subsequent processing steps, like dyeing and precoating, the stitch holding of the primary carpet backing should be high enough to retain the carpet surface as produced during tufting.

To lock the tufts in the greige carpet into place a precoating can be applied to the back side of the greige carpet. The tuft bind is the force required to remove one tuft completely out of the (pre-coated or finished) carpet from the face side. It determines how strong the adhesive bond is between the pile fibers and the adhesive coating of the primary carpet backing. The pre-coat is generally applied either as a latex solution or as a foamed latex to the back side of the greige carpet and subsequently the latex is dried to form bonds between the base of the tufts and the primary carpet backing.

If the pre-coat has a too high affinity to the primary carpet backing material the pre-coat can migrate completely through the primary carpet backing to become visible at the face side of the carpet. This is known as latex bleeding, which is undesirable in certain carpet constructions.

If there is little adhesion of the pre-coat to the primary carpet backing material the pre-coat will not form sufficiently strong bonds between the base of the tufts and the primary carpet backing to keep the tufts into place during further processing. Furthermore, problems arise at cutting of the selvedges when the primary carpet backing is not well bonded to the other components of the finished carpet construction.

Normally the tufts cover the entire surface of the carpet, but under certain conditions the primary carpet backing can become visible during the use of the carpet, especially when the carpet is installed on non-flat surfaces. An example of this is the use of such nonwovens in automotive carpets. On the basis of the geometry of the car body floor the carpet has to be bent, i.e. deformed, strongly in various areas. Especially pronounced of course is the deformation in the area of the transmission tunnel. In such cases it is beneficial for the primary carpet backing to have the same color as the tuft yarns. When pre-dyed tufting yarns are being used to produce a carpet the primary carpet backing should have essentially the same color as the pre-dyed tufting yarns. However, it is not economical for the primary carpet backing manufacturer to produce different nonwoven primary carpet backings for each available colour of tufting yarn and at the same time it is not economical for the carpet manufacturer to have large amounts of different coloured primary carpet backings on stock.

Alternatively the primary carpet backing can be tufted with non-dyed, so-called raw white, tufting yarns. The greige carpet can be dyed in a subsequent processing step. It is preferred that the primary carpet backing has good dye-ability to avoid a (too large) colour mismatch between the dyed tufting yarns and the dyed primary carpet backing which would render the primary carpet backing still visible when being bent. Moreover, carpet constructions exist wherein the primary carpet backing is visible even without bending the carpet. In principal it is only required to dye the top side of the primary carpet backing which is oriented to the face side of the carpet.

SUMMARY

It is desired to improve nonwoven primary carpet backings regarding the above mentioned demands.

The above may be achieved with a primary carpet backing comprising at least a first and a second layer of fibers wherein both the first and the second layer of fibers may have a uniform composition throughout the layer of fibers, wherein the linear density of the fibers may be in the range of 1 to 25 dtex, preferably 2 to 20 dtex, more preferably 5 to 15 dtex, wherein both the first and second layer of fibers comprise at least two different polymers and wherein at least one polymer comprised in the first layer is different from the polymers comprised in the second layer.

DETAILED DESCRIPTION OF EMBODIMENTS

A layer of fibers, as used herein, means a nonwoven layer of randomly laid fibers.

Uniform composition, as used herein, cans that the type of fibers and the amount of fibers throughout the layer is constant within the limits encountered in standard nonwoven production processes. The first and second layer of fibers each comprises at least two different polymers. Preferably, the different polymers in a layer of fibers have different melting points. When a layer of fibers consists of two different polymers, one polymer will have a lower melting point than the other polymer.

In a preferred embodiment of the invention, the primary carpet backing is thermally bonded by means of binder polymer originating from the fibers. As the melting temperature of the lower melting polymer can, and preferably is, different in each layer of fibers, the thermal bonding process may be performed at the temperature corresponding to the lower melting polymer, which has the highest melting point. For example, when the first layer comprises PET and PA6 polymers and the second layer comprises PET and PP polymers, the lower melting polymer is PA6 for the first layer of fibers and PP for the second layer of fibers. As PA6 has a higher melting temperature than PP, the nonwoven may be thermally bonded at the melting temperature of PA6.

In a preferred embodiment of the present invention the different polymers exist in separate fibers to create a carpet backing comprising bifilament nonwoven layers.

The primary carpet backing may comprise additional layers of fibers consisting of only one polymer. For example, the primary carpet backing can consist of a first layer of fibers of polyamide, e.g. PA6, a second layer of fibers consisting of separate polyester and polyamide fibers (creating a bifilament nonwoven layer), a third layer of fibers consisting of separate polyester and polyolefin fibers (creating a second bifilament nonwoven layer), and, optionally, a fourth layer of polyolefin layers, e.g. PP.

In another preferred embodiment of the present invention, the different polymers exist together in bicomponent fibers to create a carpet backing comprising bicomponent nonwoven layers. The different polymers may exist together in core/sheath bicomponent fibers.

In a preferred embodiment of the present invention the different polymers in the first layer of fibers exist in separate fibers and the different polymers in the second layer exist together in bicomponent fibers to create a combination of bifilament nonwoven layers and bicomponent nonwoven layers.

In another preferred embodiment of the present invention the primary carpet backing consists of a first layer consisting of core/sheath filaments having a core of polyester, e.g. of polyethylene terephthalate (PET), and a sheath of polyamide (PA), e.g. of PA6, and a second layer consisting of core/sheath filaments having a core of polyester, e.g. of polyethylene terephthalate (PET) and a sheath of polyolefin, e.g. of PP. When the layer consisting of core/sheath filaments having a core of polyester and a sheath of polyolefin is located at the back side of the primary carpet backing and the layer consisting of core/sheath filaments having a core of polyester and a sheath of polyamide is located at the face side of the primary carpet backing, the polyamide present in the face side of the primary carpet backing improves the dye-ability of the primary carpet backing without having to dye all the fibers in the entire primary carpet backing.

When the layer consisting of core/sheath filaments having a core of polyester and a sheath of polyamide is located at the back side of the primary carpet backing and the layer consisting of core/sheath filaments having a core of polyester and a sheath of polyolefin is located at the face side of the primary carpet backing, the latex adhesion on the back side is improved to lock the tufts into place while the polyolefin present in the face side of the primary carpet backing prevent latex bleeding through the primary carpet backing due to the low affinity of the latex to the polyolefin sheath material.

In another preferred embodiment of the present invention the primary carpet backing consists of three layers of fibers, a first layer and a third layer both consisting of core/sheath filaments having a core of polyester, e.g. of polyethylene terephthalate (PET) and a sheath of polyamide (PA), e.g. of PA6, and a second layer of fibers, located in between the first and third layers, consisting of core/sheath filaments having a core of polyester, e.g. of polyethylene terephthalate (PET) and a sheath of polyolefin, e.g. of PP. The polyamide present in the layer at the back side of the primary carpet backing improves the latex adhesion to the primary carpet backing thus increasing tuft bind in the carpet, while the polyolefin present in the second (middle) layer prevents latex bleeding through the primary carpet backing to the face side of the greige carpet. The polyamide present in the layer at the face side of the primary carpet backing improves the dye-ability of the primary carpet backing thus reducing the visibility of the primary carpet backing in the finished carpet.

Primary carpet backings can also improve stitch holding capacity as the lower melting polymers in each of the layers can be tuned to maximize friction of the primary carpet backing to the polymer of the tufting yarns.

In another preferred embodiment, the primary carpet backings may comprise one or more additional layers, each of the additional layers being selected from the group consisting of woven layers, nonwoven layers, scrim layers, layers of unidirectional filaments or yarns and film layers. The primary carpet backing may comprise the additional layer(s) positioned between the first layer of fibers and the second layer of fibers.

The additional layers may, for example, be used to provide additional reinforcement to the primary carpet backing, to further improve the stitch holding performance and/or to further improve the barrier against latex bleed through.

EXAMPLES

Example 1

All samples were spunbonded using commonly known technology for depositing three layers of filaments on top of each other on a collector surface. In each sample, the basic weight of the backings amounted to 126 g/m$^2$. The filaments were all of the core/sheath type. After deposition the samples were thermally bonded at 230° C.

The reference consisted of three identical layers of fibers, each having a basic weight of 42 g/m$^2$ and consisting of bicomponent filaments having a 74/26 core/sheath volume ratio, a core of PET and a sheath of PA6, and a linear density of 15 dtex.

Sample 1 in accordance with the invention, consisted of two identical outer layers of filaments having a 74/26 core/sheath volume ratio, a core of PET and a sheath of PA6, and a linear density of 15 dtex and an inner layer of 74/26 core/sheath volume ratio, a core of PET and a sheath of PP and a linear density of 15 dtex. All three layers had a basic weight of 42 g/m$^2$.

The relevant properties of the samples were determined. Breaking strength and elongation at break before and after tufting measured in accordance with EN 29073-3 dated August 1992 at a speed of 200 mm/min.

The needle penetration resistance has been determined by measuring the force required for a single needle, Groz-Beckert needle type HK01 R-W-P-B, to penetrate the primary carpet backing. The average, minimum and maximum penetration force of 3750 individual needle penetrations have been determined to obtain relevant parameters describing penetration force as a primary carpet backing will always show significant variation in properties on the level comparable to the dimensions of a tuft needle, being only a few mm$^2$.

The stitch holding capacity of a primary carpet backing has been determined by means of tufting a primary carpet backing under conditions which are critical for backtag formation and counting the number of full backtags formed during tufting, i.e. counting the number of tufts which are removed completely from the greige carpet, in an area of 1 m by 12.2 cm containing 9600 tufts. Tufting took place with Groz-Beckert 0660 needles at a gauge of ⅕" (5.08 mm), Texture Tex PA6.6 tufting yarns type 3252 O 2×1350 dtex, a machine speed of 600 rpm, a speed difference between the supply speed of the primary carpet backing and the output speed of the greige carpet of 4.4%, a stitch rate of 40 stitches per 10 cm and a yarn feed corresponding to a pile length of 11.8 mm. The pile length has been determined by pulling out 100 tufts from the greige carpet and measuring the total length of the removed tufting yarn. The pile length can be calculated dividing the total length of tufting yarn by the number of removed tufts.

TABLE 1

| Properties before tufting | Sample 1 | Reference |
|---|---|---|
| Mass [g/m$^2$] | 125 | 125 |
| Strength in MD [N/5 cm] | 196 | 485 |
| Strength in CMD [N/5 cm] | 221 | 433 |
| Elongation in MD [%] | 16 | 32 |
| Elongation in CMD [%] | 19 | 34 |
| Average needle penetration resistance [N] | 9.28 | 14.23 |
| Minimum needle penetration resistance [N] | 2.85 | 6.19 |
| Maximum needle penetration resistance [N] | 18.24 | 24.75 |

TABLE 2

| Properties after tufting | Sample 1 | Reference |
|---|---|---|
| Mass [g/m$^2$] | 982 | 980 |
| Strength in MD [N/5 cm] | 418 | 438 |
| Strength in CMD [N/5 cm] | 373 | 296 |
| Elongation in MD [%] | 42 | 36 |
| Elongation in CMD [%] | 48 | 41 |
| Stitch holding capacity [Number of backtags] | 8 | 29 |

The example clearly shows that, although the backing has reduced strength and elongation before tufting (Table 1; about 50 to 60% lower when compared to the reference backing), the backing exhibits improved strength and elongation after tufting (Table 2; up to approximately 25% higher when compared to the reference backing). The needle penetration force of the primary carpet backing is lower which reduces the chance of needle deflection during tufting. Also, the number of backtags in the greige carpet produced with the backing has been reduced considerably, i.e. from 29 to 8 backtags.

What is claimed is:
1. A primary carpet backing comprising:
a first layer of polyester fibers and polyamide fibers;
a second layer of fibers comprised of polyester and polyolefin; and a third layer of polyamide fibers, wherein:
the first layer of fibers, the second layer of fibers, and the third layer of fibers are a nonwoven layer of randomly laid fibers,
a linear density of the first layer of fibers, the second layer of fibers, and the third layer of fibers is in a range of 1 to 25 dtex,
the first layer of fibers, the second layer of fibers, and the third layer of fibers have uniform composition throughout each layer of fibers,
both the first layer of fibers and the second layer of fibers consist of two different polymers,
at least one of the polymers in the first layer of fibers is different from one of the polymers in the second layer of fibers,
the different polymers in the first layer of fibers exist in separate fibers, and
the polyester and polyolefin in the second layer of fibers exist in bicomponent fibers.

2. The primary carpet backing according to claim 1, wherein the bicomponent fibers are core/sheath bicomponent fibers.

3. The primary carpet backing according to claim 1, wherein the primary carpet backing comprises additional layers of fibers consisting of one polymer.

4. The primary carpet backing according to claim 1, wherein the primary carpet backing comprises additional layers of fibers comprising at least two different polymers.

5. The primary carpet backing according to claim 1, wherein the primary carpet backing comprises one or more additional layers, each of the additional layers being selected from the group consisting of woven layers, nonwoven layers, scrim layers, layers of unidirectional filaments or yarns, and film layers.

6. A tufted carpet comprising the primary carpet backing according to claim 1.

7. The primary carpet backing according to claim 1, wherein the different polymers in the first layer of fibers or the second layer of fibers have different melting points.

8. A primary carpet backing comprising:
a first layer of polyester fibers and polyamide fibers;
a second layer of polyester fibers and polyolefin fibers; and
a third layer of polyamide fibers, wherein:
the first layer of fibers, the second layer of fibers, and the third layer of fibers are a nonwoven layer of randomly laid fibers,
a linear density of the first layer of fibers, the second layer of fibers, and the third layer of fibers is in a range of 1 to 25 dtex,
the first layer of fibers, the second layer of fibers, and the third layer of fibers have uniform composition throughout each layer of fibers,
the first layer of fibers and the second layer of fibers consist of two different polymers,
at least one of the polymers in the first layer of fibers is different from one of the polymers in the second layer of fibers, and
the different polymers in both the first layer of fibers and the second layer of fibers exist in separate fibers.

9. The primary carpet backing according to claim 8, wherein the primary carpet backing comprises additional layers of fibers consisting of one polymer.

10. The primary carpet backing according to claim 8, wherein the primary carpet backing comprises additional layers of fibers comprising at least two different polymers.

11. The primary carpet backing according to claim 8, wherein the primary carpet backing comprises one or more additional layers, each of the additional layers being selected from the group consisting of woven layers, nonwoven layers, scrim layers, layers of unidirectional filaments or yarns, and film layers.

12. A tufted carpet comprising the primary carpet backing according to claim 8.

13. The primary carpet backing according to claim 8, wherein the different polymers in the first layer of fibers or the second layer of fibers have different melting points.

14. A primary carpet backing comprising at least a first layer of fibers, a second layer of fibers, and a third layer of fibers wherein:
the first layer of fibers, the second layer of fibers, and the third layer of fibers are a nonwoven layer of randomly laid fibers,
a linear density of the fibers is in a range of 1 to 25 dtex,
the first layer of fibers, the second layer of fibers, and the third layer of fibers have uniform composition throughout each layer of fibers,
the first layer of fibers, the second layer of fibers, and the third layer of fibers consist of two different polymers,
the first layer of fibers, the second layer of fibers, and the third layer of fibers comprise polyester as a backbone polymer,
at least one of the polymers in the first layer of fibers is different from one of the polymers in the second layer of fibers,
the different polymers in each layer of fibers exist in bicomponent fibers,
the bicomponent fibers in the first and third layer of fibers comprise a polyester core and a polyamide sheath,
the bicomponent fibers in the second layer of fibers comprise a polyester core and a polyolefin sheath, and
the primary carpet backing comprises additional layers of fibers consisting of one polymer.

* * * * *